(12) United States Patent  
Johnson

(10) Patent No.: US 7,219,382 B2  
(45) Date of Patent: May 22, 2007

(54) MULTI-PURPOSE TOOL

(76) Inventor: Shane A. Johnson, P.O. Box 514, Lehi, UT (US) 84043

( * ) Notice: Subject to any disclaimer, the term of this patent is extended or adjusted under 35 U.S.C. 154(b) by 58 days.

(21) Appl. No.: 10/894,113

(22) Filed: Jul. 19, 2004

(65) Prior Publication Data

US 2005/0015885 A1    Jan. 27, 2005

Related U.S. Application Data

(60) Provisional application No. 60/488,886, filed on Jul. 21, 2003.

(51) Int. Cl.
- *A01B 1/20* (2006.01)
- *B25F 1/02* (2006.01)
- *A01D 11/06* (2006.01)
- *B25D 1/00* (2006.01)

(52) U.S. Cl. .............................. 7/116; 7/145
(58) Field of Classification Search ............ 7/145, 7/158, 167; 403/305; 30/308.1
See application file for complete search history.

(56) References Cited

U.S. PATENT DOCUMENTS

| | | | | |
|---|---|---|---|---|
| 576,756 A | * | 2/1897 | Cole | 7/116 |
| 1,229,667 A | | 6/1917 | Stimecz | |
| 1,272,538 A | * | 7/1918 | Sandidge, Sr. | 30/308.1 |
| 3,004,362 A | * | 10/1961 | Day | 43/6 |
| 3,404,412 A | | 10/1968 | Ryan | |
| 3,604,028 A | * | 9/1971 | Wardwell | 7/145 |
| 4,023,221 A | * | 5/1977 | Cadman | 7/114 |
| 4,114,216 A | * | 9/1978 | Gatby | 7/116 |
| 4,357,974 A | * | 11/1982 | Nannen | 30/308.1 |
| 4,402,529 A | | 9/1983 | Cavazza | 280/816 |
| 4,700,420 A | * | 10/1987 | Belanger | 7/114 |
| 4,727,609 A | | 3/1988 | Smith, Jr. | 7/145 |
| 4,926,558 A | * | 5/1990 | Brace | 30/308.1 |
| 5,033,142 A | * | 7/1991 | Templeton | 7/167 |
| 5,105,493 A | * | 4/1992 | Lugtenaar | 7/116 |
| 5,226,718 A | * | 7/1993 | Lin | 362/119 |
| 5,297,306 A | * | 3/1994 | Shandel | 7/114 |
| 5,345,635 A | | 9/1994 | Morgan | 7/116 |
| 5,428,853 A | * | 7/1995 | Menke et al. | 7/138 |
| 5,482,071 A | | 1/1996 | Liu | 135/66 |
| 5,507,051 A | | 4/1996 | Mazon | 7/116 |
| 5,799,996 A | * | 9/1998 | Fredrickson | 294/51 |
| 6,085,766 A | | 7/2000 | Geary | 135/75 |
| 6,109,365 A | * | 8/2000 | Lamoureux et al. | 173/90 |
| 6,357,067 B1 | | 3/2002 | Jones | 7/116 |
| 6,378,153 B1 | | 4/2002 | Morgan | 7/116 |
| 6,568,016 B1 | * | 5/2003 | Hoogland | 7/145 |
| 6,640,447 B2 | * | 11/2003 | Wickline | 30/308.1 |
| 6,711,772 B2 | * | 3/2004 | Grassi | 7/158 |
| 2004/0261188 A1 | * | 12/2004 | Mathis | 7/145 |

* cited by examiner

*Primary Examiner*—David B. Thomas
(74) *Attorney, Agent, or Firm*—Julie H. Gheem; Kirton & McConkie

(57) ABSTRACT

A tool that can be assembled into multiple configurations for various uses. The tool includes at least two shafts that connect together, as well as multiple, interchangeable accessories that can be coupled to the shafts. Examples of some accessories include a stake, a digging tool, a cutting tool, a swivelling seat, and a swivelling pulley.

30 Claims, 10 Drawing Sheets

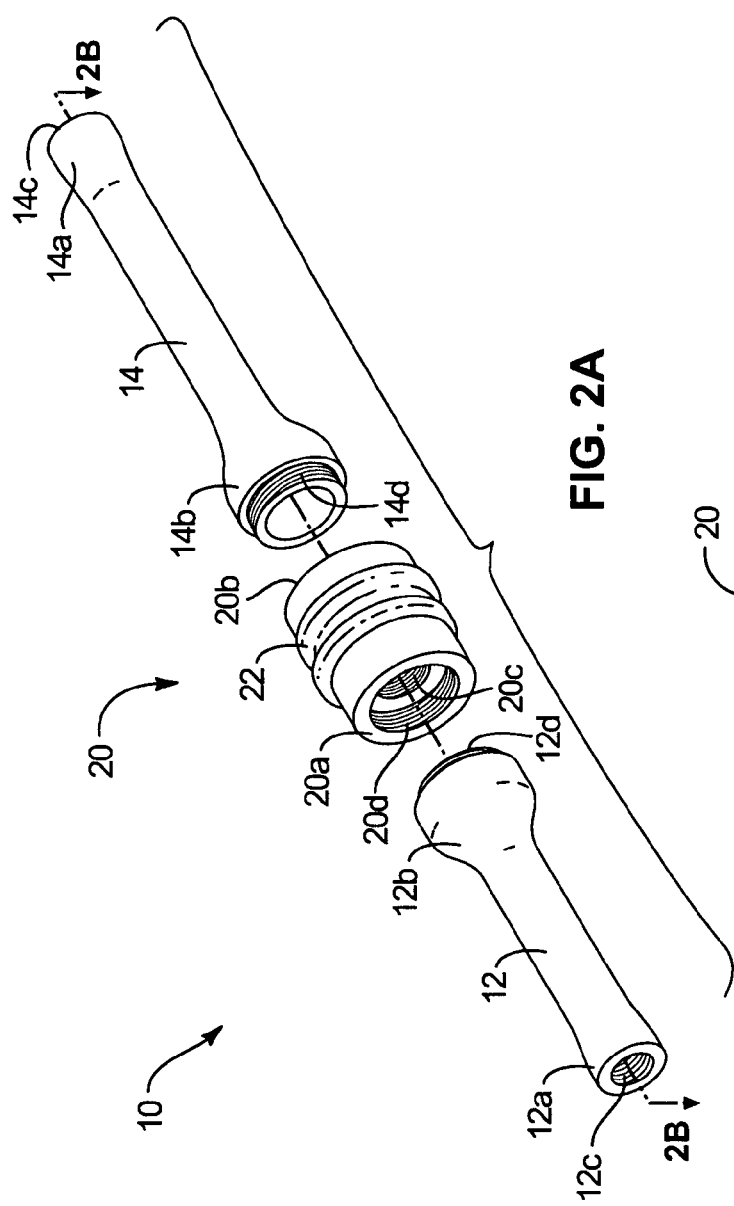
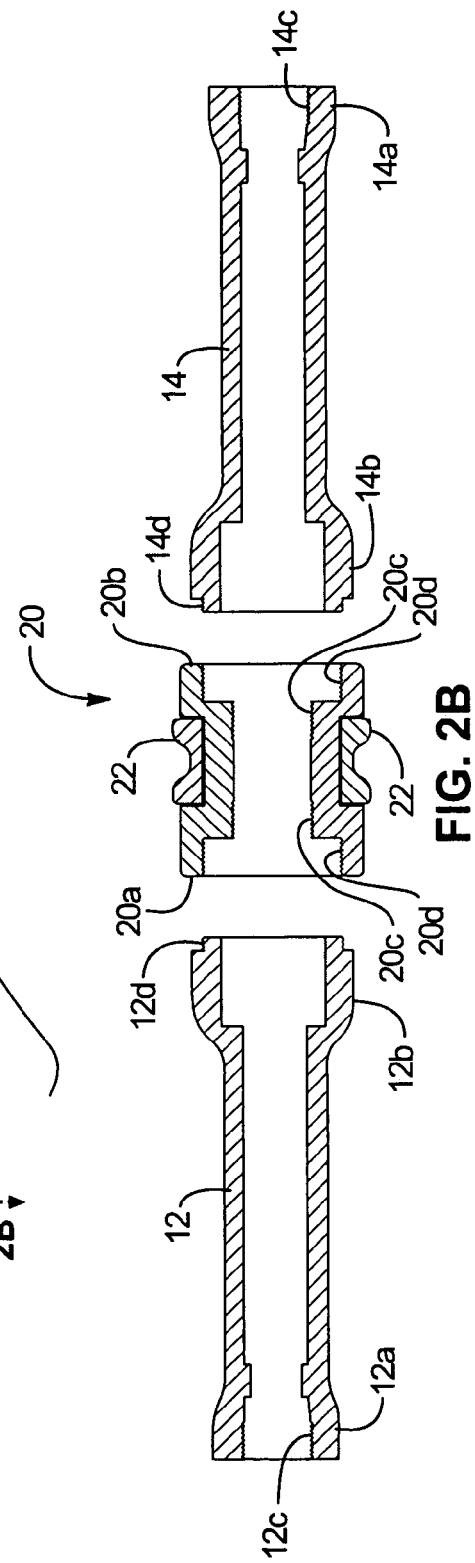
FIG. 2A
FIG. 2B

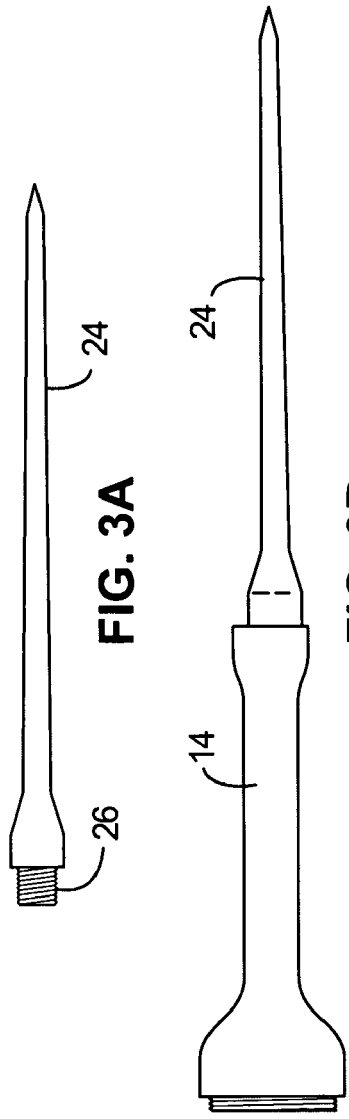
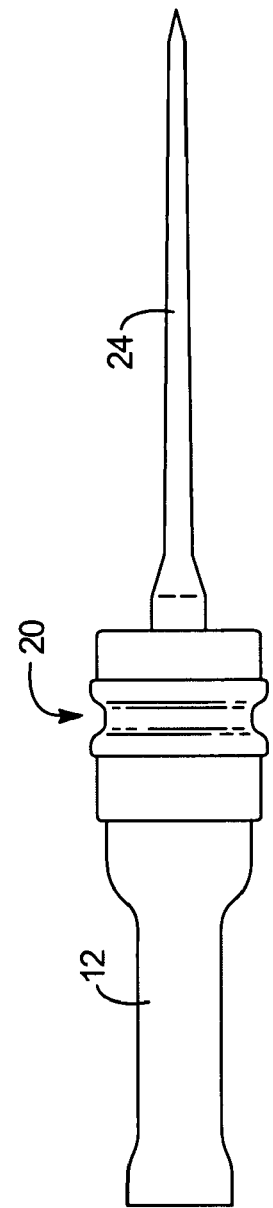
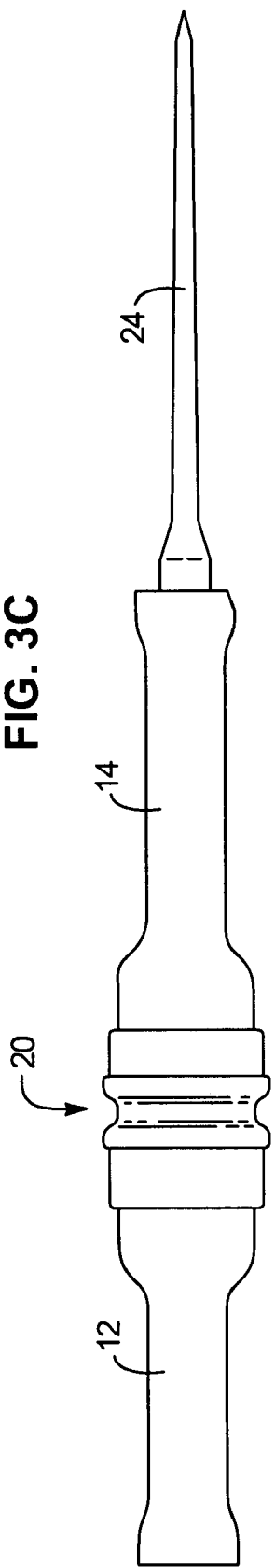
FIG. 3A  FIG. 3B  FIG. 3C  FIG. 3D

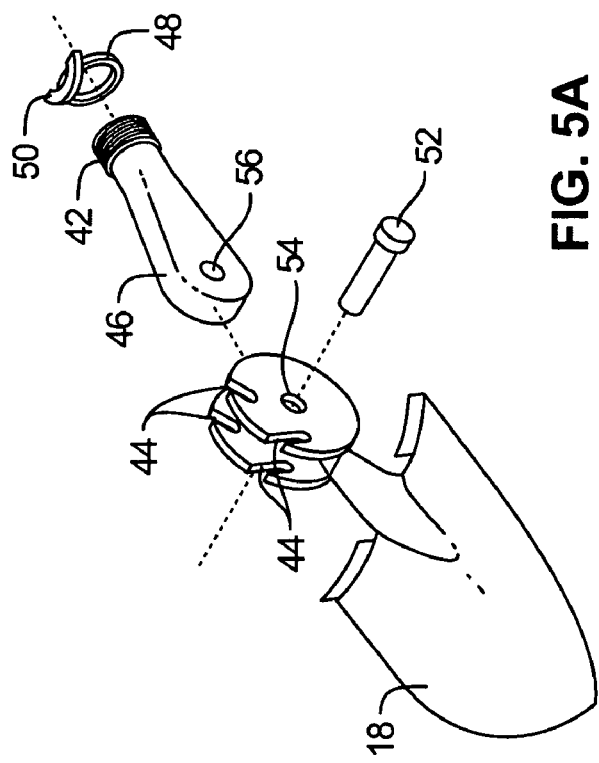
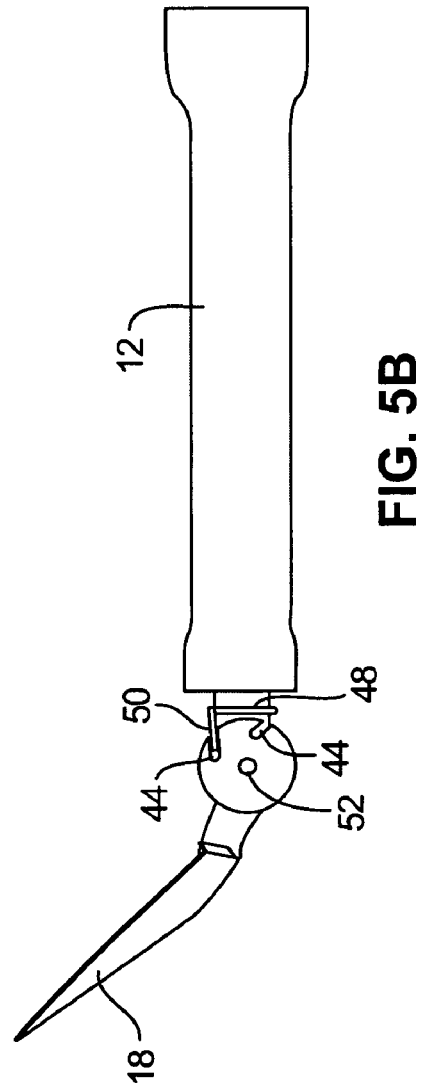
FIG. 5A
FIG. 5B

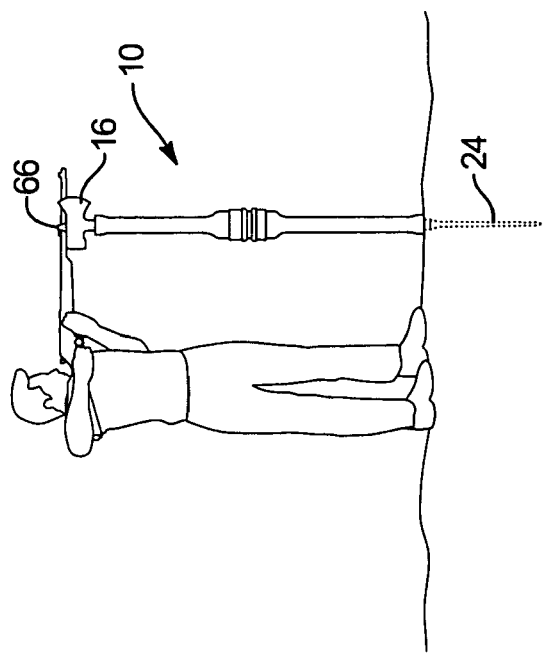
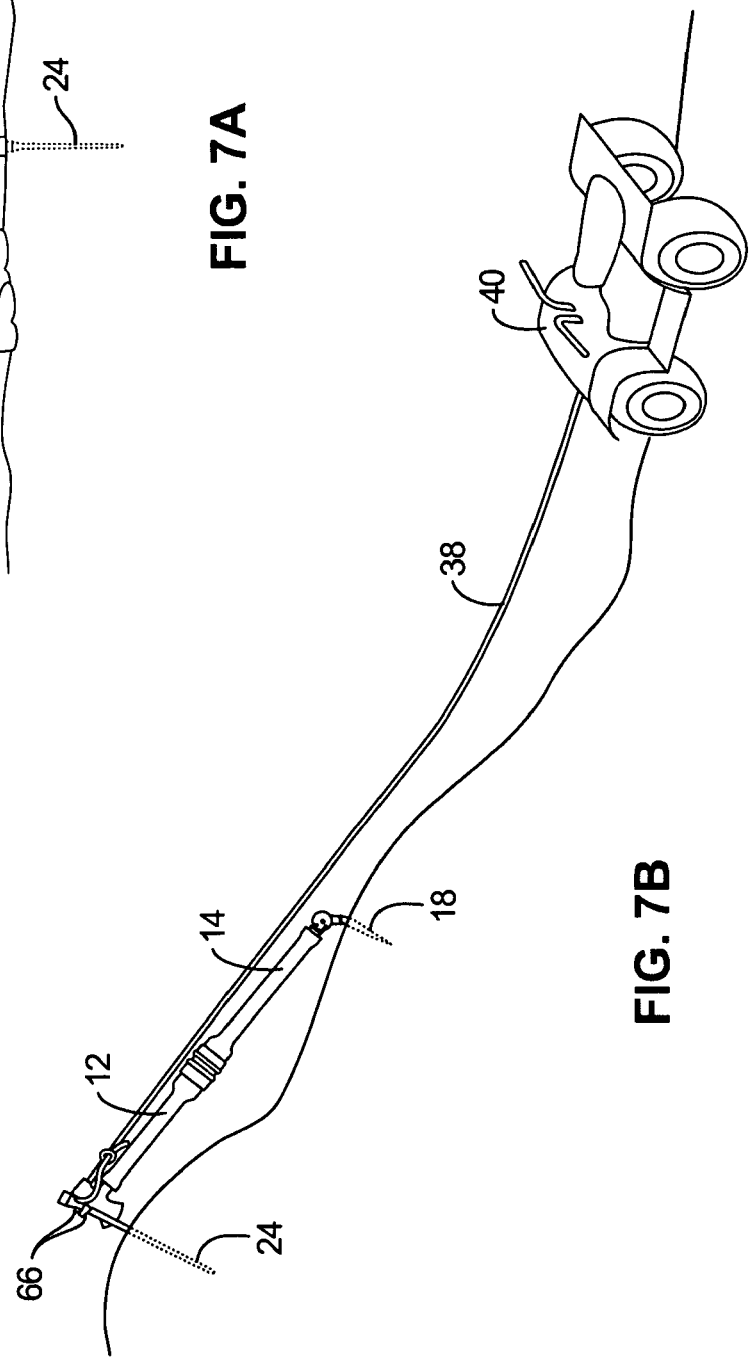
FIG. 7A
FIG. 7B

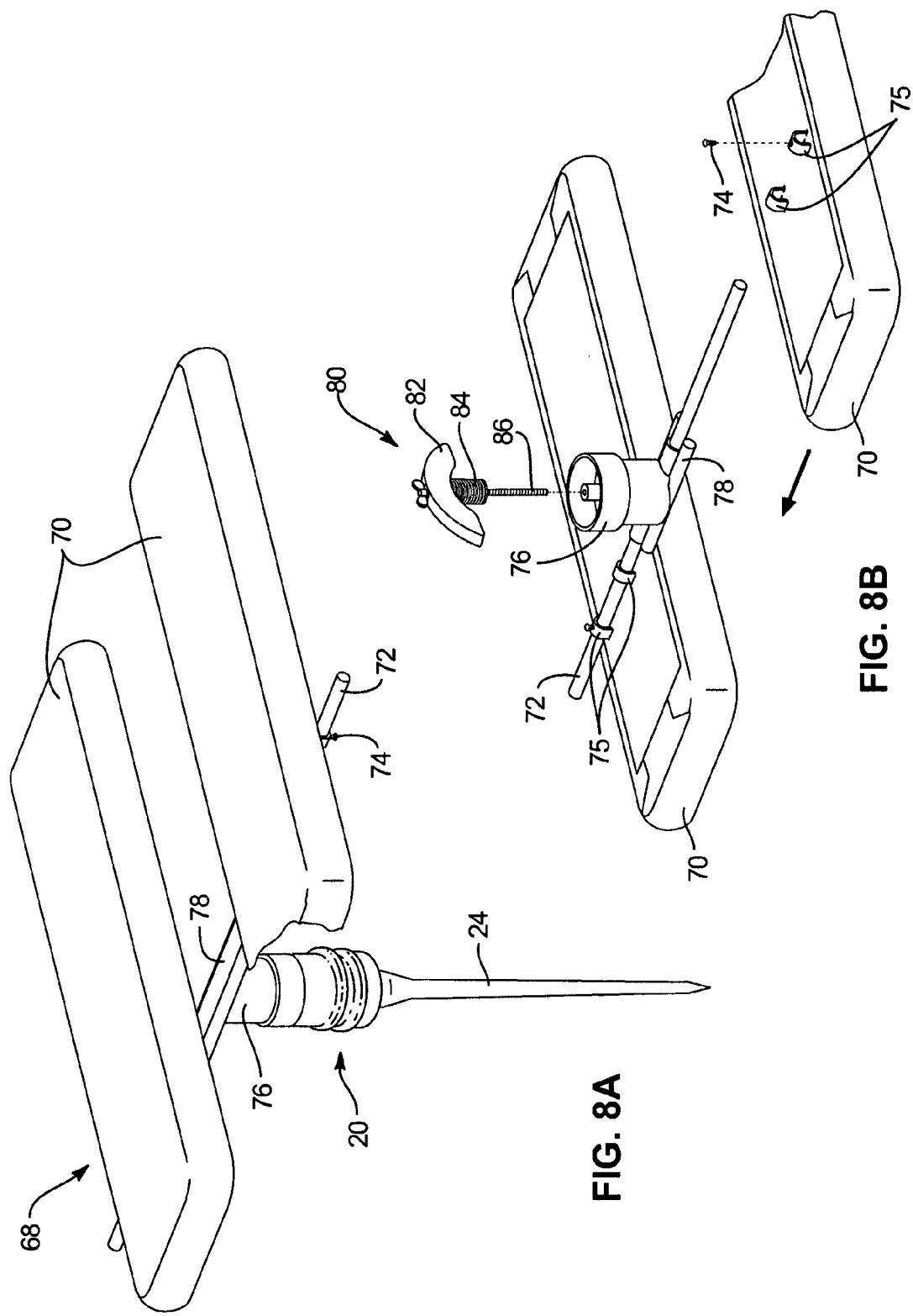

MULTI-PURPOSE TOOL

RELATED APPLICATION

This application claims priority to U.S. Provisional Patent Application Ser. No. 60/488,886, filed Jul. 21, 2003, and titled MULTI-PURPOSE TOOL.

BACKGROUND

1. Field of the Invention

The present invention relates generally to methods and systems for providing a tool that can be assembled into multiple configurations for various uses. More particularly, the present invention relates to methods and systems for providing a tool having at least two shafts as well as multiple interchangeable accessories that can be coupled to the shafts, including a stake for insertion into ground or dirt.

2. Background Information

Often, people who travel or take short trips away from home need to have access to multiple tools, but carrying multiple tools is inconvenient and cumbersome. Many tools have been invented over the years that involve multiple, interchangeable parts designed to be used with one unit to provide both flexibility and convenience all in one portable unit. However, many of these tools are complicated, difficult to manufacture, and difficult to use.

Tools primarily geared for outdoor use are particularly heavy and cumbersome and thus are not prone to be readily portable. Hence, a portable, easy-to-use multi-purpose tool that incorporated several outdoor-type tools would be a highly valued contribution to the field of art.

SUMMARY AND OBJECTS OF THE INVENTION

The present invention can generally be characterized as a tool that can be assembled into multiple configurations for various uses. The tool includes at least two shafts that connect together, as well as multiple, interchangeable accessories that can be coupled to the shafts. Examples of some accessories include a stake, a digging tool, a cutting tool, a swivelling seat, and a swivelling pulley. The present invention provides an inexpensive, efficient, and easy way to combine multiple tools into one portable device.

Accordingly, it is one object of some embodiments of the present invention to provide a portable device that incorporates multiple tools and is useful for traveling outdoors.

It is another object of some embodiments of the present invention to provide a tool comprising at least two shafts to which interchangeable accessories may be removably coupled, the accessories including a stake, an axe, and a shovel.

It is yet another object of some embodiments of the present invention to provide a system for conveniently transporting multiple tools on the back of an outdoor vehicle such as a four-wheeler.

It is a further object of some embodiments of the present invention to provide a multi-purpose tool having two hollow shafts, a connector for coupling the two shafts together, and a stake that can be removably coupled to the connector or to either of the shafts.

BRIEF DESCRIPTION OF THE DRAWINGS

Various objects and features of the present invention will become more fully apparent from the accompanying drawings when considered in conjunction with the following description and appended claims. Although the drawings depict only typical embodiments of the invention and are thus not to be deemed as limiting the scope of the invention, the accompanying drawings help explain the invention in added detail.

FIG. 2A shows a perspective exploded view of one embodiment of the multi-purpose tool of the present invention.

FIG. 2B shows a cross-sectional exploded view, taken across line 2B—2B in FIG. 2A, of one embodiment of the multi-purpose tool of the present invention.

FIGS. 3A through 3D are side plan views of various embodiments of the multi-purpose tool of the present invention.

FIG. 5A is an exploded perspective view of a digging tool in accordance with one embodiment of the multi-purpose tool of the present invention.

FIG. 5B is a side plan view of a digging tool in accordance with one embodiment of the multi-purpose tool of the present invention.

FIGS. 7A and 7B illustrate some uses of the multi-purpose tool in accordance with some embodiments of the multi-purpose tool of the present invention.

FIG. 8A is a perspective view of a seat in accordance with one embodiment of the multi-purpose tool of the present invention.

FIG. 8B is an exploded perspective view of the underside of the seat shown in FIG. 8A.

DETAILED DESCRIPTION OF THE PREFERRED EMBODIMENTS

The following detailed description, in conjunction with the claims and accompanying drawings (hereby expressly incorporated as part of this detailed description), sets forth specific numbers, materials, and configurations in order to provide a thorough understanding of the present invention. A purpose of this detailed description being to describe the invention so as to enable one skilled in the art to make and use the present invention, the following description sets forth various specific examples, also referred to as "embodiments," of the present invention. While the invention is described in conjunction with specific embodiments, it will be understood, because the embodiments are set forth for explanatory purposes only, that this description is not intended to limit the invention to these particular embodiments. Indeed, it is emphasized that the present invention can be embodied or performed in a variety of ways. The detailed description is merely representative of particular embodiments of the present invention.

Reference will now be made in detail to several embodiments of the invention. The various embodiments will be described in conjunction with the accompanying drawings wherein like elements are designated by like numeric or alphanumeric characters throughout.

Figure 1:
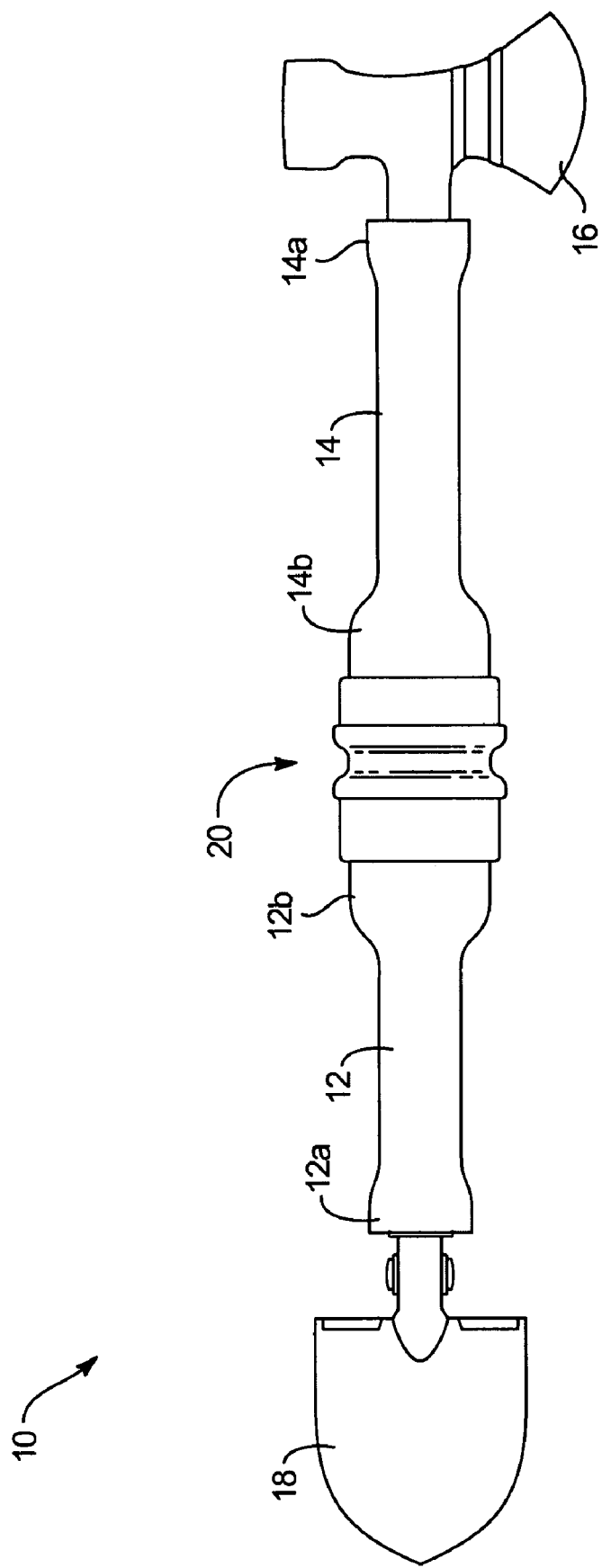
FIG. 1 is a plan view showing one example of a multi-purpose tool.

FIG. 1 is a plan view showing an example of a multi-purpose tool 10 that can be useful in a variety of situations, including when hiking, camping, four-wheeling, hunting, or during emergencies. Tool 10 has a first shaft 12, a second shaft 14, a connector 20 for connecting shafts 12 and 14, and multiple accessories that can be attached and detached relative to the shafts 12 and 14 and connector 20 in multiple configurations to make tool 10 conveniently useful for multiple purposes. In the embodiment of the tool 10 shown in FIG. 1, the accessories shown are a cutting tool 16 and a digging tool or shovel 18.

FIGS. 2A and 2B show, respectively, a perspective exploded view and a cross-sectional exploded view of shafts 12 and 14. Shafts 12 and 14 serve as a handle or grip for the tool 10 as well as a weight or stabilizing element, as will be evident from the rest of this Description. The shafts 12 and 14 are thus made of sturdy material (for example, steel) and are preferably hourglass-shaped to facilitate gripping by a clamp or a person's hand. As will be explained in conjunction with FIGS. 3A through 3D, shaft 12 and shaft 14 preferably differ in length so that the tool 10 can be assembled to have different overall lengths as needed.

As can be seen in FIGS. 2A and 2B, each of the shafts 12 and 14 have a first end 12a and 14a, and a second end, 12b and 14b. The first ends 12a and 14a of the shafts 12 and 14 have coupling elements 12c and 14c. Preferably, the shafts 12 and 14 are hollow and the coupling elements 12c and 14c are both threaded female couplings designed to mate with male couplings of one particular size or diameter. The second ends 12b and 14b have coupling elements 12d and 14d that are preferably threaded male couplings designed to mate with female couplings of another particular size or diameter. The connector 20 has a first connecting side 20a and second connecting side 20b, both of which preferably mirror each other in size and shape. Each connecting side 20a and 20b preferably has two levels or sizes of female threads, here shown as embodied in a first, inner diameter 20c and a second, outer diameter 20d.

One function of the connector 20 is to connect two ends of the shafts 12 and 14 together. Preferably, as shown in FIGS. 2A and 2B, this is accomplished by screwing the male couplings 12d and 14d on the second ends of the shafts into the outer female couplings 20d on each side 20a and 20b of the connector 20. It should be noted that in some embodiments of the tool 10, the connector 20 may be integrated with one of the shafts 12 and 14 so that the connector 20 is not detachable from the shaft that it is integrated with.

Another function of the connector 20, at least when the connector 20 includes the two levels of female threads 20c and 20d, is to provide an end piece to, to provide a particular connector for, or add additional length to the tool 10 or to portions of the tool 10. These functions will become evident further in this Description.

In the preferred embodiments of the connector 20, the connector 20 is basically hourglass-shaped and is encircled by a smaller, hourglass-shaped roller 22 nested inside the waist of the hourglass-shaped connector 20, as seen best in FIG. 2B. The roller 22 freely rotates around the connector 20 and is designed to facilitate winching when the tool 10 is used in conjunction with a rope or cable, as explained further in conjunction with FIG. 4D. It should be noted that, in some embodiments of the present invention, the roller 22 can encircle a part of either of the shafts 12 and 14 or another part of the tool 10.

FIGS. 3A through 3D illustrate various configurations of the tool 10 wherein a stake 24 such as a dead-man stake extends from one end of the tool 10. FIG. 3A is a side plan view of one embodiment of the stake 24. FIG. 3B shows a side plan view of one embodiment of the tool 10 wherein the stake 24 is directly coupled to shaft 14. FIG. 3C shows a side plan view of one embodiment of the tool 10 wherein the stake 24 is directly coupled to the connector 20, which connector 20 is directly coupled to the shaft 12. FIG. 3D shows a side plan view of the embodiment shown in FIG. 3C, except that the stake 24 is directly coupled to shaft 14, which shaft 14 is directly coupled to the connector 20. It is evident from FIGS. 3A through 3D that the configurations of the shafts 12 and 14 and the connector 20 provide a convenient and flexible means to vary the length of the tool 10 as desired. In these various configurations, the stake 24 can be used to dig, to be pounded into ground or dirt so as to act as a brace or stabilizing bar, or in other myriad useful ways.

Stake 24 has a coupler 26 that is designed to allow the stake 24 to be coupled to shaft 12, shaft 14, and/or the connector 20. In the preferred embodiments of the stake 24, the coupler 26 is a threaded male bushing that is designed to removably screw into any of the following: the first end 12a of shaft 12 via female coupling element 12c, the first end 14c of shaft 14 via female coupling element 14c, or either end 20a or 20b of connector 20 via the inner diameter of the female threads 20c. Thus, it will be noted that shafts 12 and 14 are interchangeable in any of FIGS. 3B through 3D, providing even further variety in lengths for the tool 10.

Besides the stake 24, other accessories (such as those to be described further herein), each with the same size and type of connector as each other (for example, in the preferred embodiments of the tool 10, each accessory also has threaded male connectors or bushings that are substantially identical to the coupler 26) can be attached to the shafts 12 and 14 and the connector 20 in a manner similar to that described in conjunction with the stake 24. In the preferred embodiments, these accessories can be attached to the first ends 12a and 14a of the shafts 12 and 14 as well as to the inner diameter female threads 20c on either end 20a and 20b of the connector 20. Hence, not only is the multi-purpose tool 10 flexible in that it allows the user to vary its length; the multi-purpose tool 10 also is flexible in that multiple interchangeable accessories may be conveniently combined together by placement at each end of the tool 10.

Figure 4A:
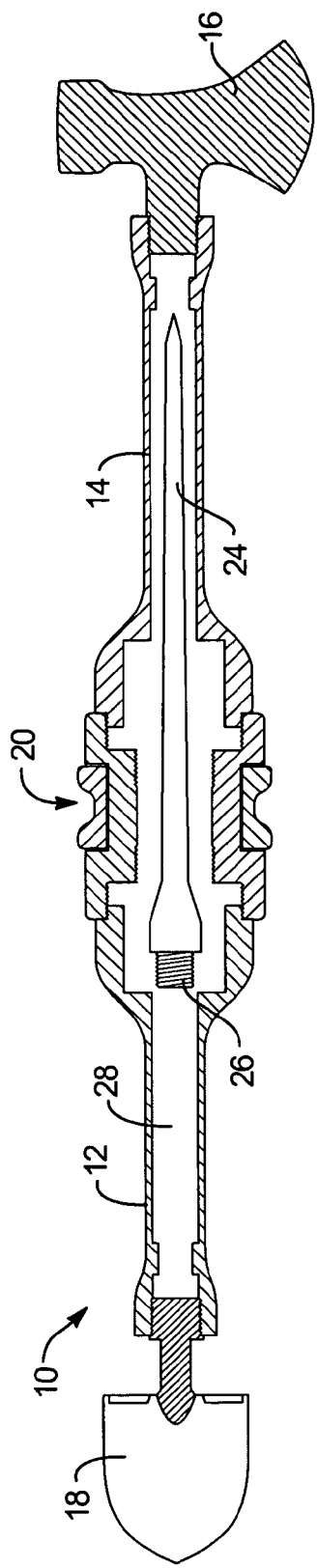
FIG. 4A is a cross-sectional view, similar to that in FIG. 2B, showing one embodiment of the multi-purpose tool of the present invention.

FIG. 4A is a cross-sectional view, similar to that in FIG. 2B, showing one embodiment of the multi-purpose tool of the present invention wherein the stake 24 is shown as being stored in a hollow portion 28 of the shafts 12 and 14 to facilitate transportation of the tool 10. In this embodiment, the stake 24 is loosely contained in the hollow 28, but a piece of PVC or something else suitable may be placed inside to prevent the stake 24 from rattling or moving excessively inside the tool 10. Other items may also be placed inside the hollow 28, including items such as a wrench, a spark plug socket, or a lug socket.

Figure 4B:
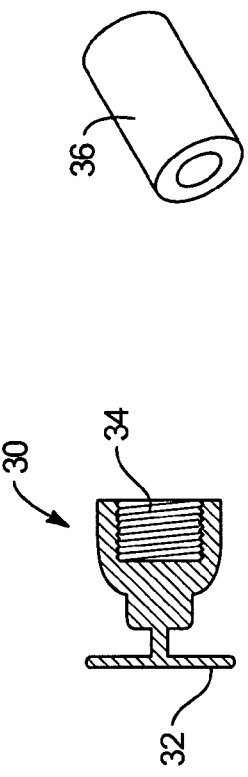
FIG. 4B is a sectional view of one portion of the multi-purpose tool present in some embodiments of the present invention.

FIG. 4B is a sectional view of a stake remover 30 that may be included in some embodiments of the multi-purpose tool 10. This stake remover 30 includes a butterfly handle 32 and a female threaded portion 34. To use the stake remover 30, the user can pound the threaded portion 34 so as to fit over the coupler 26 on the stake 24 when the stake 24 is embedded in the ground or other area. The user then need only twist the handle 32 and pull upwards to extract the stake 24. The butterfly handles 32 may be retractable or bendable so as to allow placement of the stake remover 30 in the hollow portion 28 of the tool 10.

Figure 4C:
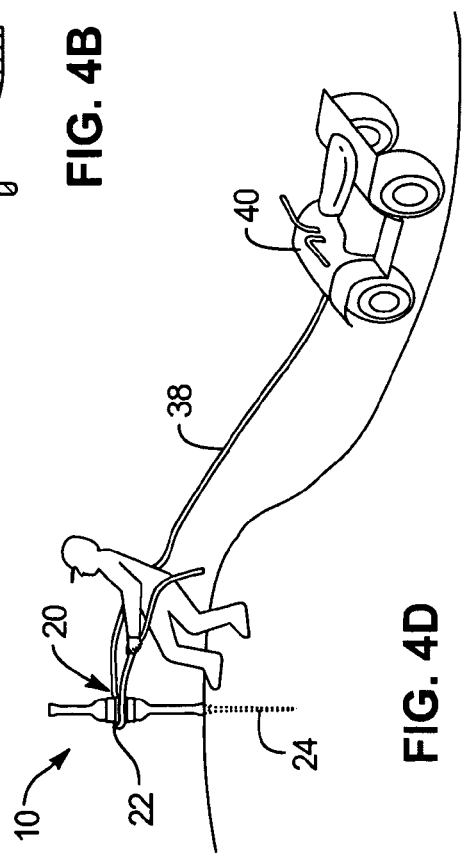
FIG. 4C is a perspective view of one portion of the multi-purpose tool present in some embodiments of the present invention.

FIG. 4C is a perspective view of a cover 36 that may be part of the multi-purpose tool 10 in some embodiments of the present invention. Cover 36 is made of sturdy material such as steel and is designed to be placed over the threaded coupler 26 on the stake 24 before a user pounds on the stake 24 to drive it into the ground or other area. The coupler 36 thus protects the threads on the coupler 26 when the user is pounding on the end of the stake 24 where the coupler 26 is located. The cover 36 might also be placed or stored in the hollow portion 28 of the tool 10.

Figure 4D:
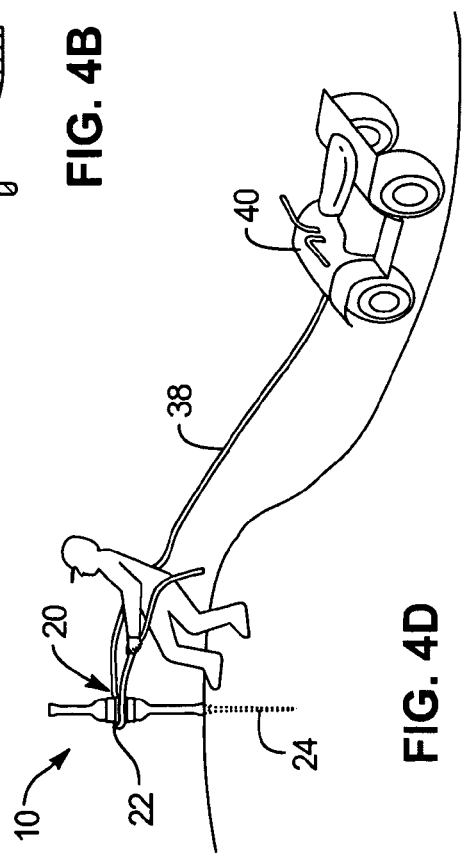
FIG. 4D illustrates one use of the multi-purpose tool according to some embodiments of the present invention.

FIG. 4D illustrates one use of the multi-purpose tool 10 according to some embodiments of the present invention. In particular, here, the tool 10 is being used as a brace to pull a heavy object (here, shown as a four-wheeler) 40 with a cable or rope 38. The tool 10 serves as a sturdy base or stabilizing element, while the hourglass roller 22 serves to facilitate movement of the cable 38 when the cable 38 is placed against the waist of the hourglass roller 22. The tool 10 can thus be a valuable aid in pulling a motorcycle out of a ravine, pulling a vehicle out of snow, transporting wild game that has been killed, or in a variety of other situations. The tool 10 and roller 22 might also be used to lift heavy objects vertically upwards when the tool 10 is placed above the object to be lifted. For example, the tool 10 may be placed near the ceiling of a garage to lift a vehicle located therein.

FIG. 5A is an exploded perspective view of a digging tool or shovel 18 in accordance with one embodiment of the multi-purpose tool 10. Digging tool 18 can be attached via coupler 42 to the first ends 12a and 14a of the shafts 12 and 14 as well as to the inner diameter female threads 20c on either end 20a and 20b of the connector 20. In the preferred embodiments, coupler 42 is a threaded male bushing designed to allow the digging tool 18 to be screwed onto and off of the shafts 12 and 14 or connector 20. Digging tool 18 is also preferably adjustable in that it can be locked into various positions, including a position that allows the digging tool 18 to be folded in entirely to facilitate transportation of the tool 10. In the presently preferred embodiments of the digging tool 18, digging tool 18 includes multiple notches 44, a neck 46, and a ring 48 with a lip 50. This digging tool 18 is assembled for digging use by placing a removable pin 52 through a hole 54 in the tool 18 and through a hole 56 in the neck 46. The ring 48 is designed to encircle the neck 46 loosely so that the ring 48 can be moved a small distance along the neck 46 between the coupler 42 and the hole 56. Thus, when the user desires to lock the digging tool 18 in a particular position, the user simply couples the coupler 42 to the desired mate—whether it be to either of the shafts 12 or 14 or to the connector 20—and simultaneously angles the digging tool 18 and the lip 50 so that the lip 50 locks into one of the notches 44, causing the digging tool 18 to lock at an angle chosen by the user. FIG. 5B is a side plan view of a digging tool 18 in such a locked position.

The neck 46 can also be used to pound the stake 24 in the ground. To do this, a user would merely need to pull the pin 52 out to remove the shovel end so that the neck 46 is exposed for use. The user would couple the connector 20 to the stake 24 and couple the neck 46 to the other side of the connector 20. The user could then pound on the neck 46 to pound the stake 24 into the ground without having to worry about ruining any threads on the stake 24.

Figure 6B:
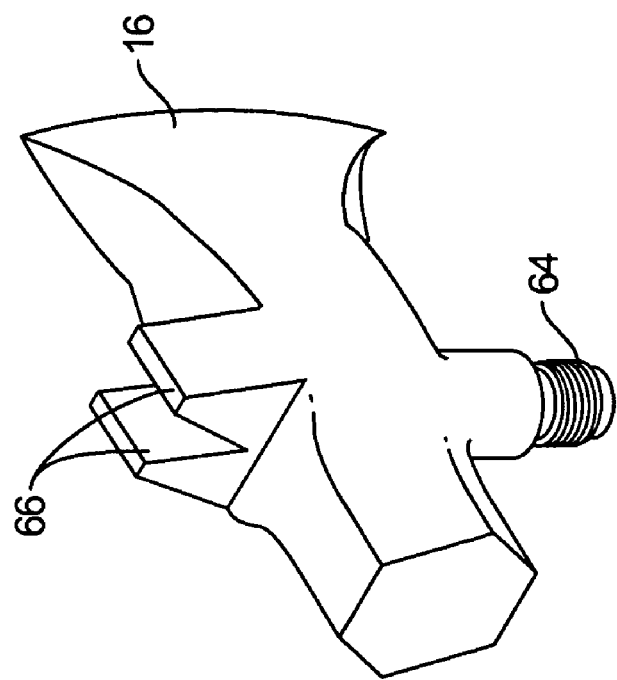
FIGS. 6A and 6B are perspective views of cutting tools in accordance with some embodiments of the multi-purpose tool of the present invention.
Figure 6A:
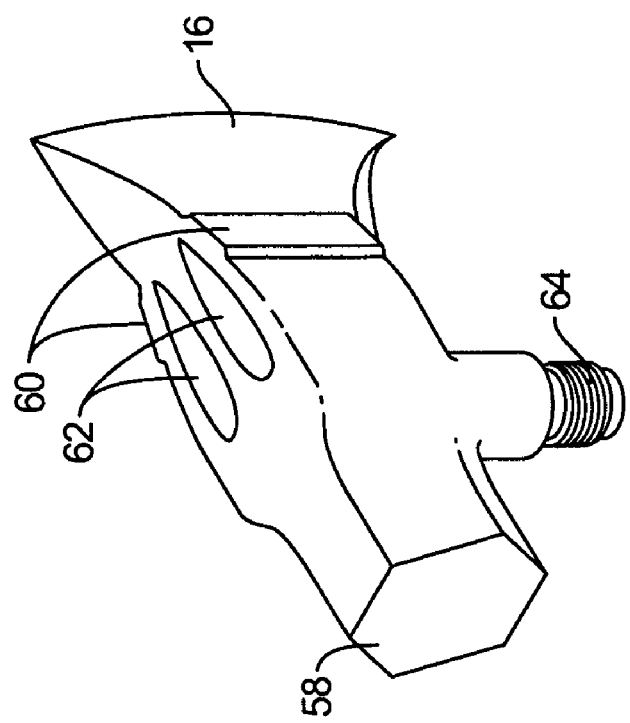

FIGS. 6A and 6B are perspective views of cutting tools 16 in accordance with some embodiments of the multi-purpose tool 10 of the present invention. The preferred cutting tool 16 is an axe or a hatchet that includes a blunt end 58 for hammering down the stake 24 or other objects. Additionally, the preferred cutting tool 16 has a ridge or extension 60 on each side of the cutting tool 16. This extension 60 helps a user to pull out the cutting tool 16 when the cutting tool 16 gets stuck, for example, in a piece of wood that the user is trying to chop. If the cutting tool 16 gets stuck, the presence of the extension 60 creates additional space between the cutting tool 16 and the wood—space in which the user may wiggle the cutting tool 16 and thereby more easily extricate it from the wood.

In some embodiments of the cutting tool 16, holes 62 are in the cutting tool 16 to allow the cutting tool 16, when isolated from any other parts of the multi-purpose tool 10, to be transported more easily. For example, the cutting tool 16 can be turned upside-down so that the holes 62 are placed over a vertical extension on, for example, the back of a four-wheeler.

As with the other accessories, the cutting tool 16 can be attached via coupler 64 to the first ends 12a and 14a of the shafts 12 and 14 as well as to the inner diameter 20c on either end 20a and 20b of the connector 20. In the preferred embodiments, coupler 64 is a threaded male bushing designed to allow the cutting tool 16 to be screwed onto and off of the shafts 12 and 14 or connector 20.

FIG. 6B shows a fork 66 that may be present in some embodiments of the cutting tool 16. Some uses of the fork 66 are discussed in conjunction with FIGS. 7A and 7B.

FIG. 7A illustrates how a user might use one embodiment of the multi-purpose tool 10 to help him or her keep a steady aim while shooting a gun, arrow, or other projectile. FIG. 7A shows a user who has placed the stake 24 in the ground and placed a gun in between the forks 66 to allow the user to aim and make a stable shot. FIG. 7B shows how the multi-purpose tool 10 might be used to hold or stabilize a heavy object 40 with a cable or rope 38. There, the stake 24 is placed in the ground, and the digging tool 18 is locked into an angle and pushed into the ground so that the forks 66 are positioned to help brace or stabilize the stake 24. This usage would be particularly helpful in situations where the ground is too loose to rely on the stake 24 alone.

FIG. 8A is a perspective view of a seat 68 in accordance with one embodiment of the multi-purpose tool 10, and FIG. 8B is an exploded perspective view of the underside of the seat shown in FIG. 8A. The seat 68 comprises two pads 70 that are adjustable in that at least one of the pads 70 can be slid along a bar 72 supporting the pads 70. A bolt, screw, or other locking mechanism 74 serves to allow the user to lock the pad or pads 70 in the desired position by locking against brackets 75 attached to the pads 70 and through which the bar 72 is inserted.

A chamber 76 sits on a base 78 coupled to the bar 72. The chamber 76 is sized to fit over any end of the shafts 12 and 14 as well as over the connector 20. FIG. 8A shows the chamber 76 fitting over the connector 20, which, in turn, is coupled to the stake 24. To use the seat 68, the stake 24 is at least partly placed in the ground so as to provide a base for the seat 68. One or both of the shafts 12 and 14 can be connected between the stake 24 and the chamber 76 so as to provide different height levels for the seat 68 as desired.

Preferably, the chamber 76 is shaped so that the user sitting on the pads 70 can swivel 360 degrees in any direction by using his or her feet. This feature would be particularly useful for a user sitting on the seat 68 and using binoculars because he or she would be able to swivel 360 degrees around to obtain a panoramic view or to track running wildlife. In addition, the seat 68 enables a person to sit comfortably even on steep slopes. Also, if desired, the pads 70 can be slid apart to allow a user sitting thereon to go to the bathroom.

Preferably, the pads 70 have a wood base and are covered with padding. Also, the bar 72 preferably sits somewhat off-center relative to the length of the pads 70 so that the user's center-of-gravity (the user's rear end) is near the bar 72 when he or she sits on the pads 70. In some embodiments, the wood base may have a slightly elevated bank where the user's knees would lie against the pads 70. This is to help push the user's center-of-gravity to align with the stake 24.

Figure 10A:
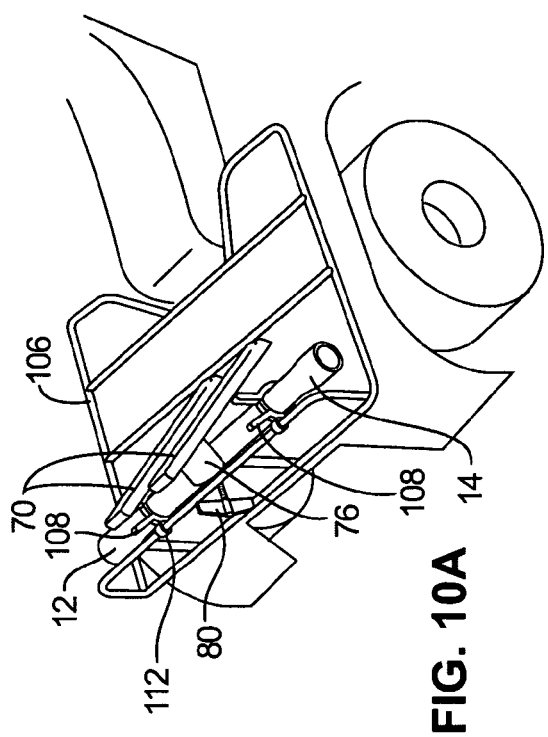
FIGS. 10A through 10C are perspective views illustrating how some embodiments of the multi-purpose tool might be attached to a four-wheeled recreational vehicle to facilitate transportation of the multi-purpose tool.

FIG. 8B shows a fastener 80 that is designed to attach the seat 68 to a rack 106 such as those found on four-wheelers (see FIG. 10A). The preferred fastener 80 comprises a handle 82, a threaded shaft 86, and a high-tensile spring 84 placed between the handle 82 and the threaded shaft 86. The threaded shaft 86 is designed to be received by a threaded portion on this chamber 76 so as to hold the seat 68 firmly against the rack 106 of a four-wheeler or All-Terrain-Vehicle ("ATV") as shown in FIG. 10A. As can be seen in FIG. 10A, the high-tensile spring 84 allows the fastener 80 to flex and provides the fastener 80 with a stay-tight fitting. Preferably, a wing nut on the fastener 80 allows the user to loosen the fastener 80, no matter how tight the fastener 80 is fastened, by turning the wing nut a one-half turn in either direction.

Figure 9:
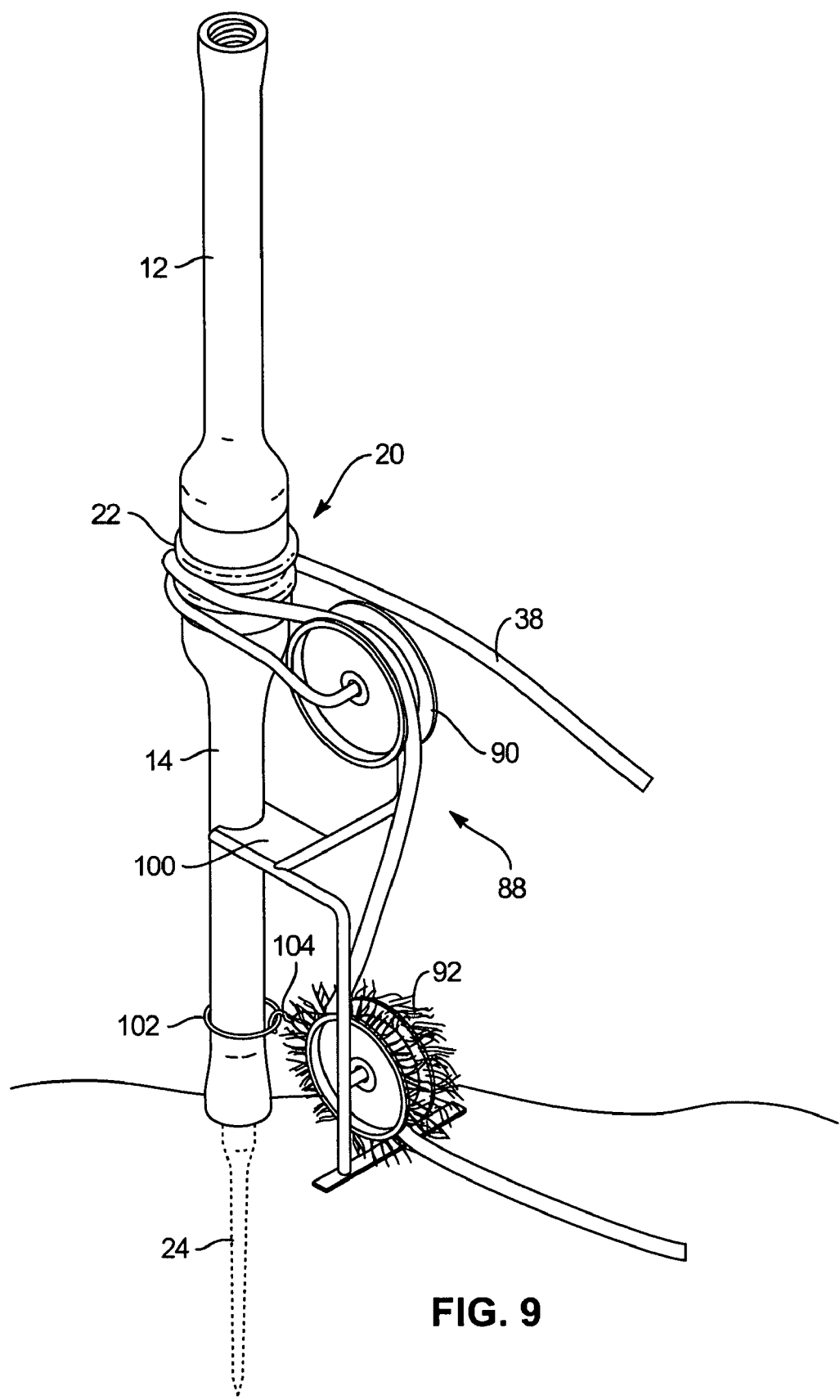
FIG. 9 is a perspective view of a pulley in accordance with one embodiment of the multi-purpose tool of the present invention.

FIG. 9 shows a swivelling pulley 88 in accordance with one embodiment of the present invention. The swivelling pulley 88 is designed to work in conjunction with roller 22 to allow rope or cable 38 being winched to move 360 degrees around the shafts 12 and 14. This particular swivelling pulley 88 comprises a standard pulley 90 and a scrubbing pulley 92, the latter serving to scrub dirt off of the rope 38 as it moves through the scrubbing pulley 92. A loose ring 102 and an adjustable hook 104 serve to allow the user to tighten the swivelling pulley 88 against the shafts 14 or 12 as needed. A brace 100 bears against the shafts 12 or 14 to guide the swivelling pulley 88 in a 360 degree circle around the shafts 12 or 14. The stake 24 is posted into the ground for stabilization when the swivelling pulley 88 is in use.

Figure 10C:
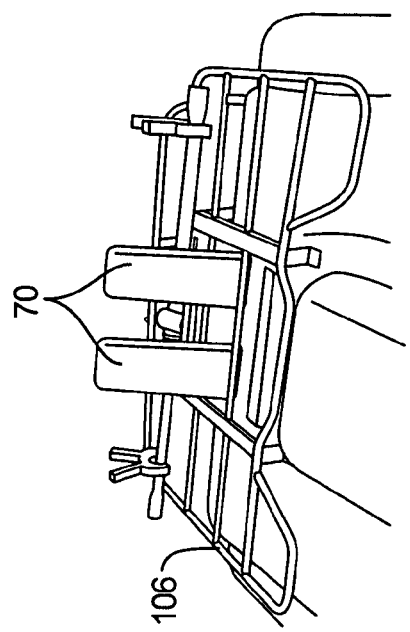
Figure 10B:
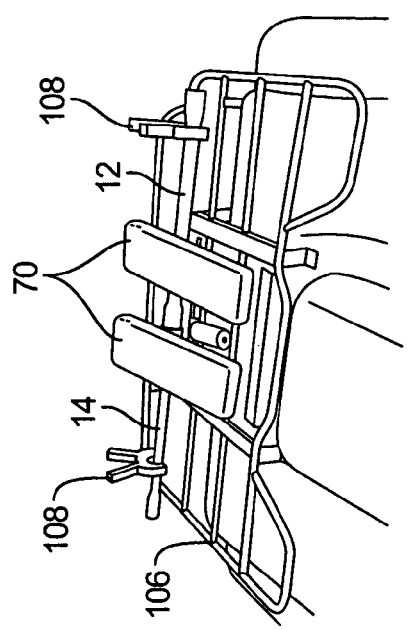

FIGS. 10A through 10C are perspective views illustrating how some embodiments of the multi-purpose tool might be attached to a four-wheeled recreational vehicle to facilitate transportation of the multi-purpose tool 10. In the preferred embodiments, the length of the two shafts 12 and 14 and the connector 20 altogether is shorter than the width of a typical four-wheeler (the typical four-wheeler being about 44 inches wide) so that the tool 10 can be conveniently stored on a four-wheeler.

FIG. 10A shows two spring clamps 108 that clamp to the shafts 12 and 14. Clamps 108 are attached to the ATV rack 106 by means of a u-bolt or any other type of suitable connection 112. Foam or padding can be placed along clamps 108 so that the top of the clamps 108 can serve as a gun rest as well.

FIG. 10B shows the pads 70 of the seat 68 in a flat position against the ATV rack 106. FIG. 10C shows the pads 70 in an upright, angled position that can be used as a back rest for the ATV rider.

It should be noted that various other examples of accessories, other than the ones specifically mentioned in this Description, can be incorporated into the multi-purpose tool 10. Example of additional accessories might include the following: a tripod, swivel deck, rake, broom, hoe, fish net, or umbrella.

In addition, in the preferred embodiments, some of the threadings discussed herein are sucker rod.

It is underscored that the present invention may be embodied in other specific forms without departing from its spirit or essential characteristics. The described embodiments herein should be deemed only as illustrative.

What is claimed is:

1. A tool comprising:
   at least two shafts, at least one of said shafts having an interior cavity for holding accessories therein;
   a connector that can removably couple said shafts together; and
   a plurality of accessories removably connectable to at least one of said shafts, at least one of said accessories including a stake.

2. The tool of claim 1 wherein at least one of said plurality of accessories includes a digging tool.

3. The tool of claim 2 wherein said digging tool comprises a shovel.

4. The tool of claim 3 wherein said shovel is foldable.

5. The tool of claim 4 wherein said shovel is lockable into various angled positions.

6. The tool of claim 1 wherein at least one of said plurality of accessories includes a cutting tool.

7. The tool of claim 6 wherein said cutting tool comprises an axe.

8. The tool of claim 7 further comprising a raised edge on each side of the axe.

9. The tool of claim 7 further comprising forks on said axe.

10. The tool of claim 1 wherein the connector comprises a first connecting side and a second connecting side, each connecting side having two levels of connecting sizes.

11. The tool of claim 1 wherein the accessories may be removably connected to any of the shafts or alternatively to the connector.

12. The tool of claim 1 wherein the shafts further include an interior cavity for holding accessories therein.

13. The tool of claim 1 wherein each of the shafts have different lengths.

14. The tool of claim 1 wherein the length of the shafts and the connector, when the shafts and connector are coupled together, is less than 50 inches.

15. A tool comprising:
   at least two elongated shafts, each having an interior surface, an exterior surface, a female threaded end, and a male threaded end;
   a cylindrical connector that can removably couple said shafts together, said connector comprising a first threaded connecting side and a second threaded connecting side, at least one of the connecting sides comprising two levels of interior threads; and
   a plurality of accessories removably connectable to at least one of said threaded ends or threaded sides, at least one of said accessories including a stake.

16. The tool of claim 15 wherein the exterior surface of said cylindrical connector is hourglass-shaped, and wherein the tool further comprises a roller that loosely encircles the hourglass waist of the connector.

17. The tool of claim 15 wherein the interior surface of each of said shafts comprises a specially shaped hollow designed to store at least one of said accessories.

18. The tool of claim 15 wherein the exterior surface of said shafts is shaped like an elongated hourglass.

19. The tool of claim 15 wherein the plurality of accessories includes a foldable shovel and a pulley.

20. The tool of claim 15 wherein the plurality of accessories includes an axe and a pulley.

21. A tool comprising:
  at least two shafts;
  a connector that can removably couple said shafts together; and
  a plurality of accessories removably connectable to at least one of said shafts, at least one of said accessories including a stake, and at least one of said plurality of accessories includes a pulley.

22. The tool of claim 21 wherein the exterior surface of the connector comprises an hourglass shape, and said pulley comprises a roller that loosely encircles the hourglass waist of the connector.

23. The tool of claim 21 wherein said pulley comprises a swivelling pulley.

24. The tool of claim 21 wherein said swivelling pulley comprises a scrubbing pulley.

25. The tool of claim 21 wherein at least one of said plurality of accessories includes a swivelling seat.

26. The tool of claim 25 wherein said seat may freely swivel a full 360 degrees.

27. The tool of claim 25 wherein said seat is padded and further comprises means for coupling the seat to the back of a recreational vehicle at an angle that allows said seat to serve as a backrest for a person sitting on the recreational vehicle.

28. The tool of claim 21 wherein the plurality of accessories includes a foldable shovel and a pulley.

29. The tool of claim 21 wherein the plurality of accessories includes an axe and a pulley.

30. A tool comprising:
  at least two shafts wherein the exterior surface of each of the shafts are shaped like an elongated hourglass;
  a connector that can removably couple said shafts together; and
  a plurality of accessories removably connectable to at least one of said shafts, at least one of said accessories including a stake.

* * * * *